United States Patent [19]

Shizuri

[11] Patent Number: 4,485,557
[45] Date of Patent: Dec. 4, 1984

[54] CLAMP DEVICE FOR HEIGHT GAUGE

[75] Inventor: Akihiko Shizuri, Utsunomiya, Japan

[73] Assignee: Mitutoyo Mfg. Co., Ltd., Tokyo, Japan

[21] Appl. No.: 465,075

[22] Filed: Feb. 9, 1983

[30] Foreign Application Priority Data

Feb. 17, 1982 [JP] Japan .............................. 57-20835[U]

[51] Int. Cl.³ .............................................. G01B 5/02
[52] U.S. Cl. .............................. 33/169 R; 33/147 T; 33/143 J
[58] Field of Search .................. 33/169 R, 170, 143 J, 33/147 T, 147 J; 24/504, 505, 516, 517, 510, 511, 498, 502

[56] References Cited

U.S. PATENT DOCUMENTS

| 833,477 | 10/1906 | Nelson | 33/143 J |
| 1,795,973 | 3/1931 | Sobel | 33/169 R |
| 2,029,977 | 2/1936 | Anderson | 292/74 |
| 2,512,042 | 6/1950 | Stern | 33/143 J |
| 2,538,973 | 1/1951 | Matteucci | 33/147 J |
| 2,695,455 | 11/1954 | Zweekly et al. | 33/170 |
| 2,718,815 | 9/1955 | Manning | 33/169 R |
| 3,273,248 | 9/1966 | Halverstadt | 33/147 T |
| 3,304,616 | 2/1967 | Coulman | 33/170 |
| 3,314,686 | 4/1967 | Smolka et al. | 292/74 |
| 4,419,825 | 12/1983 | Miyamoto | 33/169 R |

FOREIGN PATENT DOCUMENTS

| 822906 | 7/1949 | Fed. Rep. of Germany | 33/143 J |
| 844072 | 7/1952 | Fed. Rep. of Germany | 33/143 J |
| 952663 | 11/1956 | Fed. Rep. of Germany | 33/143 J |
| 9429 | 4/1908 | United Kingdom | 33/143 J |
| 936301 | 9/1963 | United Kingdom | 33/143 J |

Primary Examiner—Victor N. Sakran
Attorney, Agent, or Firm—Flynn, Thiel, Boutell & Tanis

[57] ABSTRACT

A clamp device of a height gauge for clamping to a support a feed box connected to a slider through a fine movement means. In this clamp device, a lever, one end portion of which can abut against the support, is rotatably supported by the feed box, and a biasing means for biasing the lever to abut the aforesaid one end portion against the support is provided between the lever and the slider, whereby a moment to tilt the feed box does not act on the feed box even when the lever is grasped to release the clamping, so that the feed box and the slider can be moved smoothly.

6 Claims, 3 Drawing Figures

CLAMP DEVICE FOR HEIGHT GAUGE

BACKGROUND OF THE INVENTION

1. Field of the Invention

This invention relates to a clamp device of a height gauge, and more particularly to improvements in a device for clamping to a support a feed box connected to a slider through a fine movement means, for effecting a fine movement of the slider.

2. Description of the Prior Art

The most common clamp device of the conventional height gauge has been constructed such that the feed box is screwed onto a support, whereby it has been impossible to suitably clamp the feed box as a slider is moved, thereby resulting in very low controllability. Therefore, there has been adopted that a clamp device of a height gauge, wherein the feed box can be clamped or released from the clamping while the slider is moved through operation of a lever.

However, with the lever-operation type clamp device of the prior art, the feed box abuts against the support ununiformly when the clamping is released, whereby it has been difficult to smoothly move the feed box and the slider along the support. More specifically, FIG. 1 shows the conventional clamp device, in which a slider 2 and a feed box 3 are slidably supported by a support 1, respectively, and the slider 2 and the feed box 3 are connected to each other through a fine movement means 4.

A substantially L-shaped lever 5 is rotatably supported by the feed box 3 through a pivot 5A, and one end of this lever 5 can abut against the support 1 through a sheet spring 6 secured to the feed box 3. The other end portion of the lever 5 extends along the slider 2 and formed with a handgrip 7. A block member 8 is affixed to the sheet spring 6, a compression coil spring 9 is confined between this block member 8 and the lever 5, and the aforesaid one end of the lever 5 is biased by this compression coil spring 9 to abut against the support 1 through the sheet spring 6. In consequence, with the conventional clamp device of the height gauge, when the handgrip 7 is grasped to release the clamping, a moment to tilt the feed box 3 is exercised by the compression coil spring 9, whereby the feed box 3 and the support 1 are brought into an ununiformly abutted state, thus making the feed box 3 and the slider 2 slide not smoothly. Furthermore, the compression coil spring 9 is confined between the lever 5 and the sheet spring 6 of the feed box 3, so that no satisfactory clamping force can be obtained, thereby decreasing the durability of the clamping force.

SUMMARY OF THE INVENTION

The present invention has as its object the provision of a clamp device of a height gauge, capable of obtaining a clamping force of a sufficient value and very smoothly sliding a feed box along a support when the clamping is released.

To achieve the above-described object the present invention contemplates that a lever formed at one end portion thereof with an abutting portion and at the other end portion thereof with a handgrip extending along a slider is rotatably provided on the feed box, and a biasing means for biasing the lever to allow the abutting portion to abut against the support is provided between a predetermined position on the handgrip of the lever and the slider, thus permitting no moment to act on the feed box as the lever is grasped to release the clamping.

DETAILED DESCRIPTION OF THE PREFERRED EMBODIMENTS

Description will hereunder be given of the embodiment of the present invention with reference to the drawings.

Figure 1:
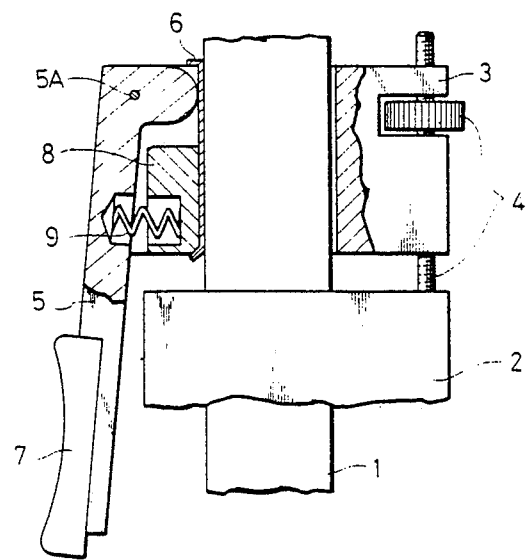
FIG. 1 is a front view, partially cut away, showing an example of the conventional clamp device of the height gauge.
Figure 2:
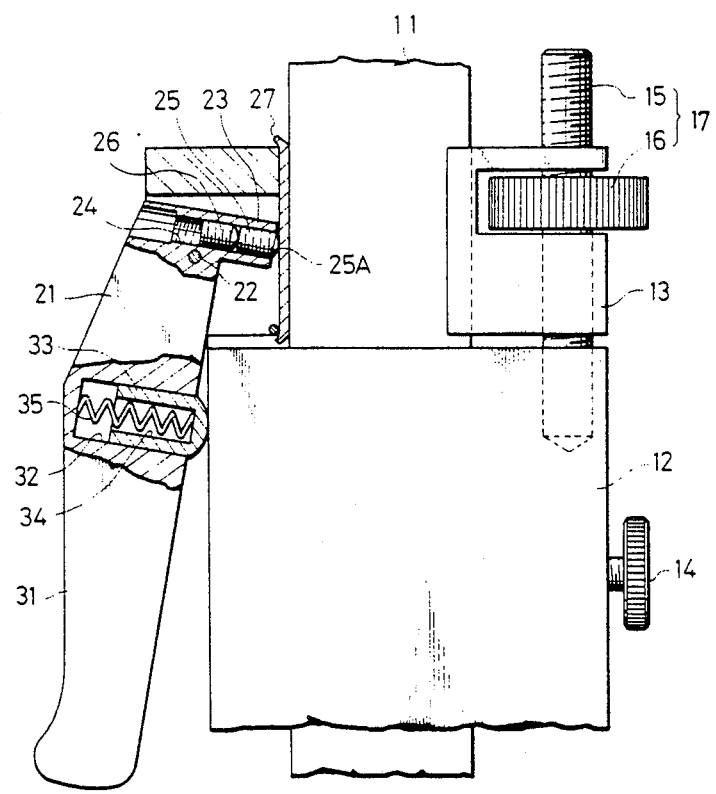
FIG. 2 is a front view, partially cut away, showing an embodiment of the clamp device of the height gauge according to the present invention.

FIG. 2 shows one embodiment of the clamp device of the height gauge according to the present invention, in which a slider 12 and a feed box or clamp body 13 are slidably supported by a support 11, respectively. Provided on the slider 12 is a set-screw 14 enabling the slider 12 to be affixed to the support 11 at a desired position. Further, affixed to the slider 12 is a feed screw 15 projected by a predetermined length from the feed box 13. This feed screw 15 is projected extending through the feed box 13, and threadably coupled to a feed wheel 16 provided in the feed box 13 at an intermediate portion of the feed box 13. The feed screw 15 and the feed wheel 16 constitute a fine movement means 17.

A lever 21 is provided on the feed box 13 at a side opposite to the fine movement means 17. A pivot 22 is inserted through a predetermined position on the top end portion in the drawing of the lever 21. The lever 21 is rotatably supported by the feed box 13 through this pivot 22 at a central position of the feed box 13 in the longitudinal direction of the support 11. A projection 23 projected by a predetermined length towards the support 11 is formed on the lever 21 further upwardly of the pivot 22, and a threaded hole 24 is formed in this projection 23 in the longitudinal direction thereof. This threaded hole 24 has openings at opposite ends thereof, an abutting screw 25 is threadably coupled into this threaded hole 24 at the side of the support 11, and this abutting screw 25 is adjusted in its threadably coupled position, so that projection of the abutting screw 25 from the projection 23 towards the support 11 can be adjusted. Furthermore, a locking screw 26 is threadably coupled into the threaded hole 24 in contact with one end of the abutting screw 25 opposite to the support 11, and the abutting screw 25 can be affixed in its threadably coupled position by means of this locking screw 26. In addition, the end portion of the abutting screw 25 at the side of the support 11 constitutes an abutting portion 25A.

Figure 3:
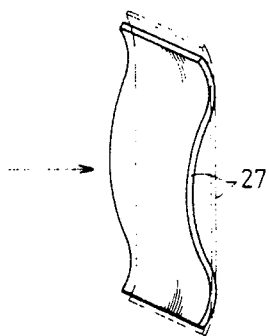
FIG. 3 is a perspective view showing the shape of a sheet spring in the present embodiment.

A sheet or leaf spring 27 as being an intermediate member is interposed between the end portion of the abutting screw 25 at the side of the support 11 and the support 11, and the abutting portion 25A is adapted to abut against the substantially central position of the sheet spring 27. Furthermore, the sheet spring 27 is supported at opposite end portions thereof, as shown in the drawing, by the feed box 13 and has a central portion curved towards the abutting screw 25. The sheet spring 27 comes into substantially full contact with the peripheral edge of the support 11 when urged against the support 11 by means of the abutting screw 25. The central portion of the sheet spring 27 comes to be slightly raised towards the abutting screw 25 when free from the external force (Refer to FIG. 3).

On the other hand, the lower end portion, as shown in the drawing, of the lever 21 is extended along the slider 12 and formed with a handgrip 31. Penetratingly provided at the substantially central portion of the lever 21 in the longitudinal direction thereof is a columnar guide hole 32 having a predetermined depth and opening towards the slider 12, and a spring cover 33 is slidably coupled into this guide hole 32.

The spring cover 3 has a head portion disposed at the side of the slider 12 and formed into a curved surface such as a hemisphere. The spring cover 33 has a bottom portion disposed at the side thereof opposed to the slider 12 and formed with a recess 34 having a predetermined depth, which is directed to the head portion. One end portion of a compression coil spring 35 as biasing means is inserted into and held by this recess 34. The other end of the compression coil spring 35 is inserted into the bottom portion of the guide hole 32. The head portion of the spring cover 33 is abutted against the slider 12 by a biasing force of this compression coil spring 35, whereby the lever 21 is biased, so that the abutting screw 25 can be abutted against the feed box 13 through the sheet spring 27.

Description will now be given of action of the present embodiment.

To move the slider 12 along the support 11, it is necessary to loosen the set-screw 14 for the slider. Even when this set-screw 14 is loosened, if the handgrip 31 of the lever 21 is not grasped and squeezed together with the slider 12, the slider 12 remains clamped by the support 11. More specifically, when the lever 21 is not operated, the abutting portion 25A of the abutting screw 25 is abutted against the support 11 through the sheet spring 27 by the biasing force of the compression coil spring 35. Because this biasing force is the biasing force of the compression coil spring 35, which has been increased by the principle of a lever, a clamping force of a sufficient value can be obtained even if a compression coil spring 35 having a particularly great strength is not used.

When both the feed box 13 and the slider 12 as a whole are grasped so as to squeeze the handgrip 31 of the lever 21 towards the slider 12, the spring cover 33 is moved towards the guide hole 32 against the biasing force of the compression coil spring 35 and the abutting portion 25A moves in a direction of being separated from the support 11, whereby the sheet spring 27 returns to the natural condition, so that the clamping can be released.

Upon moving the slider 12 together with the feed box 13 to a desired position along the support 11 with the clamping being released as described above, the release of the lever 21 immediately causes the feed box 13 to be clamped. Thereupon, the slider 12 is finely adjusted by means of the fine adjustment means 17, and the slider 12 is locked by means of the set-screw 14 as necessary.

Description will hereunder be given of the advantages of the present embodiment.

When the handgrip 31 of the lever 21 is drawn towards the slider 12 to separate the abutting portion 25A from the support 11, the sheet spring 27 being the intermediate member returns into the natural condition, whereby the clamping is released. In this case, the lever 21 is supported at the spring cover 33 thereof by the slider 12, whereby no moment to tilt the feed box 13 acts to bring the feed box 13 into a state ununiformly abutted against the support 11, differing from the case of the conventional clamp device supported by the feed box 13. In consequence, the slider 12 and the feed box 13 can be smoothly moved.

Moreover, when the handgrip 31 is drawn, the biasing force of the compression coil spring 35 is absorbed into a hand of a worker who grasps the lever 21 and the slider 12 at the same time, and the slider 12 is not urged against the peripheral edge of the support 11, so that the slider 12 can avoid becoming heavy.

In consideration of the lever having the abutting portion 25A, pivot 22 and spring cover 33 as being the point of application, fulcrum and better dynamic point, respectively, the distance between the fulcrum and the better dynamic point can be greatly increased because the spring cover 33 is abutted against the slider 12. In consequence, a clamping force of a very high value can be obtained as compared with the biasing force of the compression coil spring 35 because a force of a high value can be obtained at the point of application, and hence, even when the compression coil spring 35 is weakened in its resiliency to some extent due to use for a long period of time, there occurs no particular change in the clamping force, thus improving the durability of the clamping force to a great extent. Furthermore, the abutting portion 25A abuts against the substantially central portion of the sheet spring 27, which also offers the advantage that the durability of the clamping force is improved. As described above, the abutting portion 25A abuts against the substantially central portion of the sheet spring 27, and moreover, the pivot 22 is disposed at the substantially central portion in the vertical direction as shown in the drawing of the feed box 13, so that the clamping force can act on in a direction substantially perpendicular to the support 12, thereby enabling to reliably effect the clamping.

Necessity of increasing the resiliency of the compression coil spring 35 to a great extent can be eliminated because the clamping force of a very high value can be obtained as compared with the biasing force of the compression coil spring 35. In consequence, such an advantage is offered that the lever 21 can be easily operated to thereby improve the controllability of the lever 21. Furthermore, the compression coil spring 35 abuts against the slider 12 through the spring cover 33, whereby the position of abutment is smoothly moved, thus improving the controllability of the lever 21.

In the above-described embodiment, the compression coil spring 35 as being the biasing means for the lever 21 is provided in the lever 21, but, may be provided on the slider 12. In effect, it suffices to use any one which is confined between the slider 12 and the lever 21, for biasing the projection 23 of the lever 21 toward the support 11.

The lever 21 is supported through the pivot 22 at the substantially central position of the feed box 13 in the longitudinal direction of the support 11, but need not necessarily be supported at the substantially central position. However, supporting the lever 21 at the substantially central position makes it possible to readily prevent the moment to tilt the feed box 13 from occurring when the clamping is released and also enables a construction in which the abutting portion 25A abuts against the substantially central position of the sheet spring 27 during clamping to be adopted.

Further, the abutting portion 25A provided at one end of the lever 21 is formed by the end portion of the abutting screw 25 threadably coupled to the lever 21 in a manner to be linearly movable in the direction of abutment. However, when there is no need for particularly adjusting the position of the abutting portion 25A and so forth, one end of the lever 21 may be integrally formed as the abutting portion or the like.

The sheet spring 27 being the intermediate member need not necessarily be provided. However, the provision of the sheet spring 27 makes it possible that the feed box 13 is smoothly moved, and the urging force of the abutting portion 25A is spread all over the surface of the flattened sheet spring 27 during clamping, thus enabling to stabilize the clamped state. In this case, the sheet spring 27 may be formed of a mere thin copper sheet having no resiliency. However, the provision of resiliency is advantageous in that the feed box 13 can be reliably clamped and, when the clamping is released, the sheet spring is automatically curved to decrease an area of contact with the support 11, so that the operation during movement can be smoothed.

As has been described hereinabove, the present invention can provide a clamp device of a height gauge, capable of obtaining a clamping force of a sufficient value and permitting the feed box to smoothly slide along the support when the clamping is released.

What is claimed is:

1. A height gauge comprising: an upright support; a slider slidably mounted on said support; a feed box slidably mounted on said support; fine movement means connecting said feed box to said slider so that the position of said slider with respect to said feed box can be finely adjusted;
   a sheet spring secured to said feed box, said sheet spring having one face which contacts said support when said sheet spring is urged against said support;
   a lever pivotally mounted on said feed box and provided at one end portion thereof with abutting means capable of abutting against said sheet spring and urging said one face of said sheet spring into contact with said support, said lever being provided at the other end portion thereof with a handgrip extending alongside said slider, said abutting means including a first screw, one end of which first screw abuts against said sheet spring, said first screw being threadedly coupled in a threaded hole in said lever in such a manner that the length of projection of said first screw out of said hole towards said support is adjustable by rotation of said first screw, and a second screw threadedly coupled in said threaded hole of said lever and engaging the inner end of said first screw so as to releasably lock said first screw in a fixed position in said hole.

2. A clamp device as claimed in claim 1, wherein said sheet spring is supported at opposite end portions thereof by said feed box and has a central portion which bulges towards said abutting portion when said sheet spring is not being held against said support.

3. A height gauge, comprising:
   an upright support;
   a clamp body slidably mounted on said support;
   a slider slidably mounted on said support and positioned adjacent to and below said clamp body;
   fine movement means connecting said slider to said clamp body so that said clamp body and said slider can be moved jointly along said support, said fine movement means including means for effecting fine adjustment of the position of said slider relative to said clamp body;
   an upright elongated leaf spring secured to said clamp body and positioned between said clamp body and said support, said leaf spring having a longitudinally central, curved portion projecting away from said support and having longitudinal end portions on opposite sides of said central portion and projecting toward said support, said leaf spring being a sheet-form piece having one surface facing said support and adapted to be pressed into substantially face-to-face contact with said support when said leaf spring is urged against said support, said leaf spring having a second surface facing away from said support;
   an elongated lever pivotally mounted on said clamp body, one end of said lever having an abutting portion positioned to abut against said second surface of said leaf spring at said curved portion thereof and urge said leaf spring into face-to-face contact with said support whereby to clamp said clamp body against movement along said support, the other end of said lever having a handgrip formed thereon, said handgrip extending alongside said slider, said handgrip having a guide hole which opens toward said slider;
   a compression coil spring positioned between said handgrip of said lever and said slider for urging said handgrip away from said slider and thereby urging said abutting portion of said lever against said curved portion of said leaf spring, one end of said compression spring being inserted into said guide hole; and
   a spring cover covering the opposite end of said compression spring, said spring cover having a head portion with a rounded surface, said rounded surface of said head portion being urged into resilient contact with said slider by said compression spring, said compression spring urging said lever to a position in which said abutting portion deforms said curved portion of said leaf spring and urges said leaf spring into face-to-face contact with said support, thereby releasably clamping said clamp device on said support.

4. A height gauge as claimed in claim 3, wherein said lever is mounted for pivotal movement about a pivot positioned adjacent to said abutting portion of said lever.

5. A height gauge as claimed in claim 4, wherein said clamp body is formed such that said abutting portion is effective to clamp said support between said leaf spring and said clamp body, and said lever and said fine movement means are positioned on opposite sides of said support.

6. A height gauge as claimed in claim 5 in which said lever has a threaded hole adjacent to said one end thereof, and said abutting portion is comprised of a first screw threaded into said threaded hole and projecting outwardly therefrom in such a manner that the distance said first screw projects from said lever is adjustable by rotation of said first screw, and a second screw threaded into said threaded hole and engaging the inner end of said first screw to releasably lock said first screw in said hole.

\* \* \* \* \*